US012754815B2

(12) United States Patent
Potti et al.

(10) Patent No.: US 12,754,815 B2
(45) Date of Patent: Oct. 6, 2026

(54) MANAGING OPERATION OF DATA PROCESSING SYSTEMS USING TIME-WEIGHTED TELEMETRY DATA

(71) Applicant: Dell Products L.P., Round Rock, TX (US)

(72) Inventors: Ashok Narayanan Potti, Bangalore (IN); Tsehsin Jason Liu, Wellesley, MA (US); Zijia Wang, London (GB); Dale Wang, Hayward, CA (US); Min Gong, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/989,917

(22) Filed: Dec. 20, 2024

(65) Prior Publication Data

US 2026/0178461 A1 Jun. 25, 2026

(51) Int. Cl.
*G06F 11/30* (2006.01)

(52) U.S. Cl.
CPC ...... *G06F 11/3075* (2013.01); *G06F 11/3006* (2013.01)

(58) Field of Classification Search
CPC .......................... G06F 11/3006; G06F 11/3075
See application file for complete search history.

(56) References Cited

U.S. PATENT DOCUMENTS

| | | | |
|---|---|---|---|
| 6,836,750 | B2 | 12/2004 | Wong |
| 9,658,914 | B2 | 5/2017 | Ganesan |
| 9,898,389 | B2 | 2/2018 | Campbell |
| 10,096,030 | B1 | 10/2018 | Hayon |
| 10,795,792 | B2 | 10/2020 | Savino |
| 11,283,863 | B1 | 3/2022 | Cleaver |
| 2005/0289071 | A1 | 12/2005 | Goin |
| 2011/0083122 | A1 | 4/2011 | Chen |
| 2011/0154331 | A1 | 6/2011 | Ciano |
| 2017/0024240 | A1 | 1/2017 | Black |
| 2017/0235624 | A1 | 8/2017 | Farinacci |

(Continued)

OTHER PUBLICATIONS

Garcia-Morato et al., "A General Framework for Distributed Approximate Similarity Search With Arbitrary Distances", arXiv:2405.13795v2, Aug. 7, 2024, retrieved from <https://arxiv.org/pdf/2405.13795> on Dec. 18, 2024 (21 pages).

(Continued)

*Primary Examiner* — Soe Hlaing
(74) *Attorney, Agent, or Firm* — WOMBLE BOND DICKINSON (US) LLP

(57) ABSTRACT

Methods and systems for managing operation of a distributed system of data processing systems are disclosed. The operation may be managed by identifying that a data processing system has drifted from a previous state based on telemetry data for the data processing system. Based on a similarity map, the data processing system may maintain a time-weighted telemetry data cache that may include telemetry data for a portion of data processing systems deemed to be similar to the data processing system. The time-weighted telemetry data cache and/or the similarity map may subsequently be updated when the data processing system is identified to have drifted. The updated time-weighted telemetry data cache may be used for detecting anomalies in the telemetry data for the data processing system.

20 Claims, 6 Drawing Sheets

(56) References Cited

U.S. PATENT DOCUMENTS

| | | | | |
|---|---|---|---|---|
| 2017/0255874 | A1 * | 9/2017 | Chafle | G06N 20/10 |
| 2021/0350248 | A1 | 11/2021 | Rogers | |
| 2022/0303291 | A1 | 9/2022 | Baldini Das Neves | |
| 2022/0383229 | A1 * | 12/2022 | Shrestha | G06F 11/0751 |
| 2023/0022222 | A1 | 1/2023 | Files | |
| 2023/0195560 | A1 | 6/2023 | Haririan | |
| 2024/0267280 | A1 | 8/2024 | Madiya | |
| 2025/0061307 | A1 | 2/2025 | Tran | |
| 2025/0307712 | A1 | 10/2025 | Carofiglio | |
| 2025/0370837 | A1 | 12/2025 | Koga | |
| 2026/0025407 | A1 | 1/2026 | Himmelhuber | |

OTHER PUBLICATIONS

Tennenholtz et al., "Demystifying Embedding Spaces Using Large Language Models", arXiv:2310.04475v2, Mar. 13, 2024, retrieved from <https://arxiv.org/html/2310.04475v2> on Dec. 18, 2024 (34 pages).

Um et al., "Vector Embeddings by Sequence Similarity and Context for Improved Compression, Similarity Search, Clustering, Organization, and Manipulation of cDNA Libraries", arXiv:2308.05118, Aug. 8, 2023, retrieved from <https://arxiv.org/abs/2308.05118> on Dec. 18, 2024 (15 pages).

Dale Markowitz, "Meet AI's multitool: Vector embeddings", Google Cloud, Mar. 23, 2022, retrieved from <https://cloud.google.com/blog/topics/developers-practitioners/meet-ais-multitool-vector-embeddings> on Dec. 18, 2024 (5 pages).

* cited by examiner

MANAGING OPERATION OF DATA PROCESSING SYSTEMS USING TIME-WEIGHTED TELEMETRY DATA

FIELD

Embodiments disclosed herein relate generally to managing operation of a distributed system comprising data processing systems. More particularly, embodiments disclosed herein relate to detection of an anomaly in the operation using time-weighted telemetry data.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
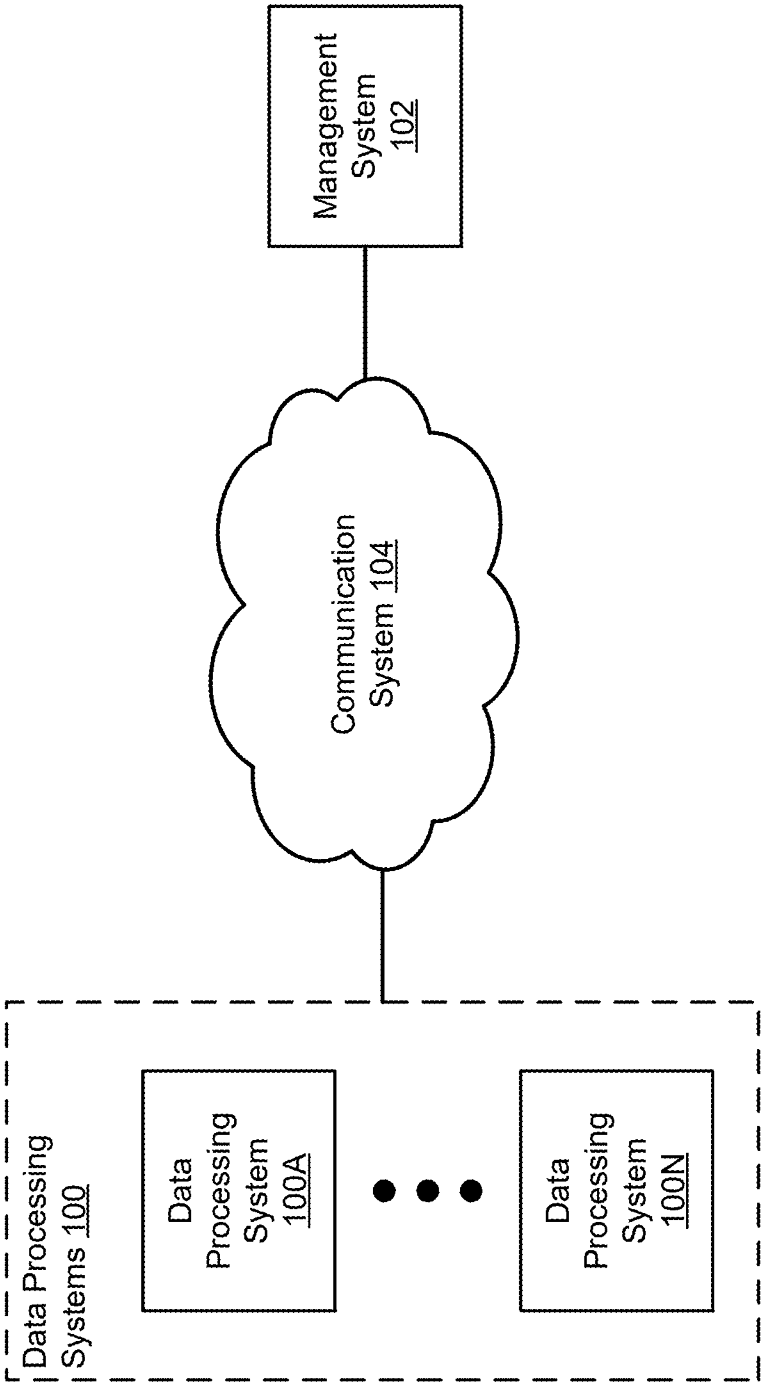
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of a distributed system comprising data processing systems. The data processing systems may operate in a computing infrastructure that may be managed with and/or without a central processing entity. For example, the data processing systems may operate using a self-organizing infrastructure system. To do so, a data processing system of the data processing systems may be classified as a member of a similarity group of a plurality of similarity groups. Each data processing system of the data processing systems may maintain a copy of a similarity map that defines at least a portion of the plurality of similarity groups.

While operating, a data processing system may obtain telemetry data relevant to operation of the data processing system. Additionally, the data processing system may maintain a local time-weighted telemetry data cache that stores telemetry data over time for at least one other data processing system deemed to be similar to the data processing system by the similarity map. The time-weighted telemetry data cache and/or historic telemetry data for the data processing system may be used to detect an anomaly in operation of the data processing system.

Because the data processing system may drift from a previous state (e.g., used to classify the data processing system as a member of the similarity group), the similarity map may be updated when the data processing system is determined to have drifted. To update the similarity map, the data processing system may be reclassified to a new similarity group (e.g., a portion of the data processing systems may be identified as being similar to the data processing system) based on telemetry data. The new similarity group may be identified by applying a weighted algorithm to telemetry data (e.g., of a global time-weighted telemetry data cache) in identifying levels of similarity between the data processing system and other data processing systems. By doing so, more recent telemetry data may be weighted more highly in the identification. Subsequently, a threshold used to identify whether operation of the data processing system is anomalous may be updated for use in detecting anomalies and/or drift.

In an instance where the data processing system is determined to not have drifted (e.g., telemetry data of the data processing system has not drifted compared to telemetry data of the first similarity group, compared to telemetry data of a new similarity group, etc.), a second determination may be made regarding whether the telemetry data is anomalous using the threshold (e.g., updated threshold, or otherwise). If determined to be anomalous, a management process may be performed to update operation of the data processing system to facilitate provisioning of desired computer-implemented services.

Thus, embodiments disclosed herein may provide an improved method for managing operation of a distributed system comprising data processing systems. By adjusting for drift by updating a similarity map and/or criteria used to detect anomalous operation of a data processing system, operation of the data processing system may be updated to provide desired computer-implemented services.

In an embodiment, a method for managing operation of a distributed system comprising data processing systems is provided. The method may include: (i) obtaining telemetry data for a data processing system of the data processing systems; (ii) making a first determination regarding whether the data processing system drifted from a previous state using the telemetry data and historic telemetry data for the data processing system; (iii) in a first instance of the first determination where the data processing system has drifted: (a) updating a similarity map using the telemetry data and a global time-weighted telemetry data cache for the data processing systems, the updated similarity map indicating a portion of the data processing systems as being similar to the data processing system; (b) updating a local time-weighted telemetry data cache for the portion of the data processing system to obtain an updated local time-weighted telemetry data cache; (c) making a second determination regarding whether the telemetry data is anomalous using the updated local time-weighted telemetry data cache; and (d) in a first instance of the second determination where the telemetry data is anomalous: (i) performing a management process for the data processing system based on the telemetry data to facilitate continued provisioning of computer implemented services.

The method may also include: (i) in a second instance of the first determination where the data processing system has not drifted: (a) making a third determination regarding whether the telemetry data is anomalous using the local time-weighted telemetry data cache; (b) in a first instance of the third determination where the telemetry data is anomalous: (i) performing a second management process for the data processing system based on the telemetry data to facilitate continued provisioning of the computer implemented services.

The local time-weighted telemetry data cache may include telemetry data over time from at least one of the data processing systems deemed to be similar to the data processing system by the similarity map.

Updating the similarity map may include: applying a weighting algorithm to the telemetry data to weight more recent telemetry data of the telemetry data over time more highly in identifying levels of similarity between the data processing system and other data processing systems of the data processing systems.

The weighting algorithm may apply exponentially decaying weights to the telemetry data over time.

The similarity map may quantify levels of similarity between the data processing systems, and the portion of the data processing systems is discriminated from the data processing systems based on the levels of similarity.

The levels of similarity may be based on, for the data processing system: (i) device information, (ii) network information, (iii) configuration information; and (iv) workload information.

Performing the management process may include: (i) identifying a level of autonomy for selection of a manner in which to perform the management process based on an estimated impact level of a forthcoming operation of the management process.

The level of autonomy may be identified using an autonomy model that vests more decision power in the data processing system as the estimated impact level is reduced and vests less decision power in the data processing system as the estimated impact level is increased.

Performing the management process may also include: (i) identifying a second portion of the data processing systems using the similarity map; and (ii) collaboratively performing, by the data processing system and the second portion of the data processing systems, at least the forthcoming operation in accordance with the selected manner of the management process.

In an embodiment, a non-transitory media is provided. The non-transitory media may include instructions that when executed by a processor cause the computer-implemented method to be performed.

In an embodiment, a system is provided. The system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide any type and quantity of computer-implemented services (e.g., to user of the system and/or devices operably connected to the system).

The computer-implemented services may include, for example, database services, data processing services, electronic communication services, and/or any other services that may be provided using one or more computing devices. The computer-implemented services may be provided by, for example, data processing systems 100, management system 102, and/or any other type of devices (not shown in FIG. 1). Other types of computer-implemented services may be provided by the system shown in FIG. 1 without departing from embodiments disclosed herein.

The system may include data processing systems 100. Each data processing system (e.g., 100A, 100B, etc.) may provide similar and/or different computer-implemented services, and may provide the computer-implemented services independently and/or in cooperation with other data processing systems. Data processing systems 100 may include edge devices (e.g., located at the edge of a computing infrastructure) that may, for example, generate local data, host various resources, and/or perform any other functionality.

Due to computational limitations of a given data processing system, data (e.g., telemetry data, operational data, etc.) may be generated by each data processing system and provided to a management system that may configured as a centralized processing entity. The management system may, for example, perform data processing, model training, system deployment, inference generation, and/or perform any other actions to manage operation of the data processing systems. Such processing by the management system may be negatively impacted by poor network connectivity, packet losses during transfer, expensive data transmission costs, and/or other such limitations.

Because data processing systems 100 may each host computing resources (e.g., hardware resources, software resources, etc.) capable of providing at least a portion of the computer-implemented services, data processing systems 100 may collaborate (e.g., communicate, share data, etc.) to perform actions relevant to updating operation of data processing systems 100. To collaborate, data processing systems 100 may be organized into any number and/or type of similarity groups. The similarity groups may be based on, for example, operating states, types of service provided, a physical location, and/or any other qualities of data processing systems 100.

However, a data processing system may drift from an original state of operation of the data processing system used as a basis for classifying the data processing system as a member of a similarity group. For example, the data processing system may be classified in the similarity group based on a similar workload, configuration, performance metrics, etc. While operating, the data processing system may drift from the original state by reducing and/or modifying its workload, configuration, performance, etc. When drifted, the data processing system may generate updated telemetry data (e.g., central processing unit usage, memory utilization, error logs, temperature, etc.) that may be different compared to telemetry data used to initially classifying the data processing system. As such, an ability of the data processing system to accurately detect anomalies based on the updated telemetry data obtained during operation may be reduced.

For example, consider a scenario in which data processing system 100A processes data for a database application with an initial memory usage of 40-50% of random access memory utilization. Over time, due to changes in operational efficiency (e.g., configuration changes, hardware degradation, memory leaks, etc.), data processing system 100A may have an average of 50-60% memory utilization. Whereas a spike of 70% memory utilization may be identified as anomalous using the initial memory usage (e.g., 40-50%) and an anomaly threshold of 20% above maximum usage, the spike may not be anomalous and/or require management action considering the new normal operation of data processing system 100A.

To improve an ability of the data processing system to detect anomalies in operation, the data processing system may update a similarity map using time-weighted telemetry data to accommodate for drift. By doing so, the data processing system may utilize more relevant information for accurately detecting anomalies when the data processing system is identified to have drifted.

To identify whether the data processing system has drifted from a previous state, the data processing system may use obtained telemetry data and historic telemetry data for the data processing system. For example, the telemetry data may be compared to a drift threshold that may be based on the historic telemetry data for the data processing system and/or other data processing systems in a similarity group. To compare to the drift threshold, the data processing system may, for example, monitor a cumulative change in telemetry data over a time window. Furthermore, the data processing system may maintain a local time-weighted telemetry data cache that may store telemetry data over time from other data processing systems in the similarity group.

The data processing system may maintain a copy of a similarity map that defines at least a portion of the similarity groups of the system. Each similarity map may be a local view of a similarity between data processing systems in the portion of similarity groups. The similarity map may include a chart of data processing systems of the distributed system. For example, for each data processing system on the chart, the similarity map may include a profile of the data processing system and/or information related to other profiles of other data processing systems in the respective similarity group. The profile may include, for the each of the data processing systems, attributes such as (i) device information (e.g., a chassis identification, a port identification, a system name, etc.), (ii) network information (e.g., at least one interface name, at least one virtual local area network, a media access control address, etc.), (iii) configuration information (e.g., at least one central processing unit specification, at least one memory capacity, at least one storage capacity, etc.), and/or any other information.

If the data processing system is determined to have drifted from the previous state, the similarity map maintained by the data processing system may be updated. For example, the data processing system may be reclassified to a different similarity group (e.g., that may be used to provide more desirable and/or relevant computer-implemented services) based on a similarity level between a profile of data processing system 100A and other data processing systems.

For example, to reclassify the data processing system (e.g., 100A), data processing system 100A may collaborate with at least data processing system (e.g., 100B, 100C, etc.) to evaluate the new state of data processing system 100A to obtain an evaluation outcome. The evaluation outcome may be used to update membership of data processing system 100A to a new similarity group, update the local time-weighted similarity map (e.g., by adding telemetry data of other data processing systems in the new similarity group, retrieving a new portion of telemetry data from a global time-weighted telemetry data cache, etc.), and/or any other purposes.

Furthermore, to update the similarity map and/or reclassify data processing system 100A, a weighting algorithm may be applied to the telemetry data (e.g., from a global time-weighted telemetry data cache) to weight more recent telemetry data over time more highly in identifying levels of similarity. For example, the weighting algorithm may apply exponentially decaying weights to the telemetry data over time. By doing so, a portion of data processing systems with outdated behavior may be removed from a similarity group and second portion of data processing systems with more recent and/or relevant behavior may be added to the similarity group. The local time-weighted telemetry data cache maintained by data processing system 100A may subsequently be usable to provide more relevant information and/or timely comparisons (e.g., for detecting anomalies).

Once updated, data processing system 100A may update at least one threshold usable to evaluate telemetry data for data processing system 100A. For example, a baseline for telemetry data of data processing system 100 may be updated to reflect a new normal operation of data processing system 100A. Operation of data processing system 100A may subsequently be measured against more relevant (e.g., more current) operation conditions when detecting anomalous behavior using an anomaly threshold.

By reclassifying data processing system 100A and/or determining that data processing system 100A has not drifted, data processing system 100A may be able to more accurately determine whether telemetry data for data processing system 100A is anomalous. For example, to determine whether the telemetry data is anomalous, data processing system 100A may compute an anomaly score based on deviation of the telemetry data from the baseline and compare the anomaly score to an anomaly threshold.

If the telemetry data is determined to be anomalous (e.g., an anomaly in operation is detected), data processing system 100A may perform a management process to update operation of data processing system 100A. The management process may include, for example, identifying a level of autonomy for an operation to be performed by the data processing system, identifying a second data processing system to collaborate with to identify a process to perform to update operation of the data processing system, and performing the process to update operation of the data processing system. The level of autonomy may indicate, for example, a quantity of data processing systems impacted by the process (e.g., higher level of impact may require more data processing systems involved in the collaboration and/or decision making).

The data processing system may subsequently obtain information usable to update operation of the data processing system. For example, as a result of the collaboration, the data processing system may perform a process that may include: (i) reallocating central processing unit (CPU) and/or memory resources of the data processing system, (ii) identifying and/or terminating a process that consumes excessive CPU resources, (iii) using a load balancer to evenly distribute at least one request to the data processing system, (iv) restarting at least one service, (v) deleting at least one log and/or clearing a disk cache to free up storage space, and/or performing any other actions to remediate an anomaly detected by the data processing system. By doing so, a quality of computer-implemented services provided by the data processing system may be improved.

To provide the above noted functionality, the system may include data processing systems 100, and management system 102. Each of these components is discussed below.

Data processing systems 100 may include any number of data processing systems (e.g., 100A-100N) that may provide at least a portion of the computer-implemented services (e.g., to users of data processing system 100). To do so, each data processing system (e.g., 100A-100N) of data processing systems 100 may host applications and/or computer-implemented models (e.g., large language models, generative artificial intelligence models, etc.) that provide these (and/or other) computer-implemented services. The applications and/or computer-implemented models may be hosted by one or more of data processing systems 100A-100N. For example, the applications may utilize (e.g., invoke use of, etc.) one or more backend components (e.g., the computer-implemented models, policies, backend applications, data and infrastructures, etc.) to provide the computer-implemented services.

A data processing system (e.g., 100A) of data processing systems 100 may maintain and/or host any number and/or type of information that may include a copy of similarity map, telemetry data obtained during operation of the data processing system, and/or any other information. Data processing system 100A may, for example, store the telemetry data in hardware resources (e.g., a database hosted on local storage). In addition, data processing system 100A may host a time-weighted telemetry data cache that may be updated based on a global time-weighted telemetry data cache maintained by at least a portion of data processing systems 100 and/or used to determine whether data processing system 100A has drifted from a previous state and/or demonstrates anomalous behavior.

Management system 102 may provide management services (e.g., for data processing systems 100). Management system 102 may include another data processing system configured as a centralized processing entity. For example, to provide the management services, management system 102 may be configured to receive data (e.g., telemetry data) from at least a portion of data processing systems 100 in order to manage system health, application and/or other software related deployments, physical deployments, updates, anomaly detection, anomaly analysis, anomaly resolution, and/or other similar services for data processing systems 100.

Figure 2A:
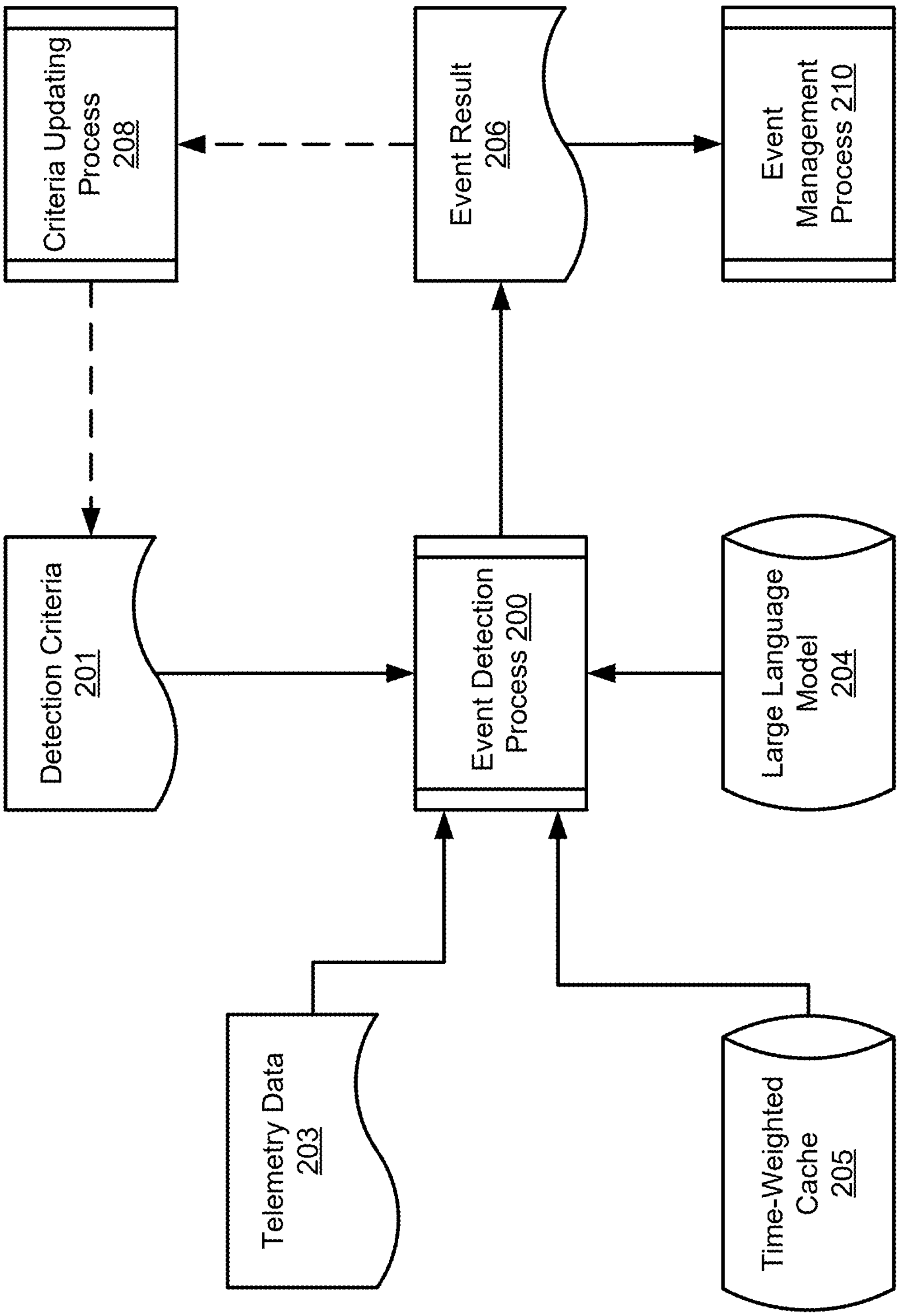
FIGS. 2A-2C show data flow diagrams in accordance with an embodiment.
Figure 2B:
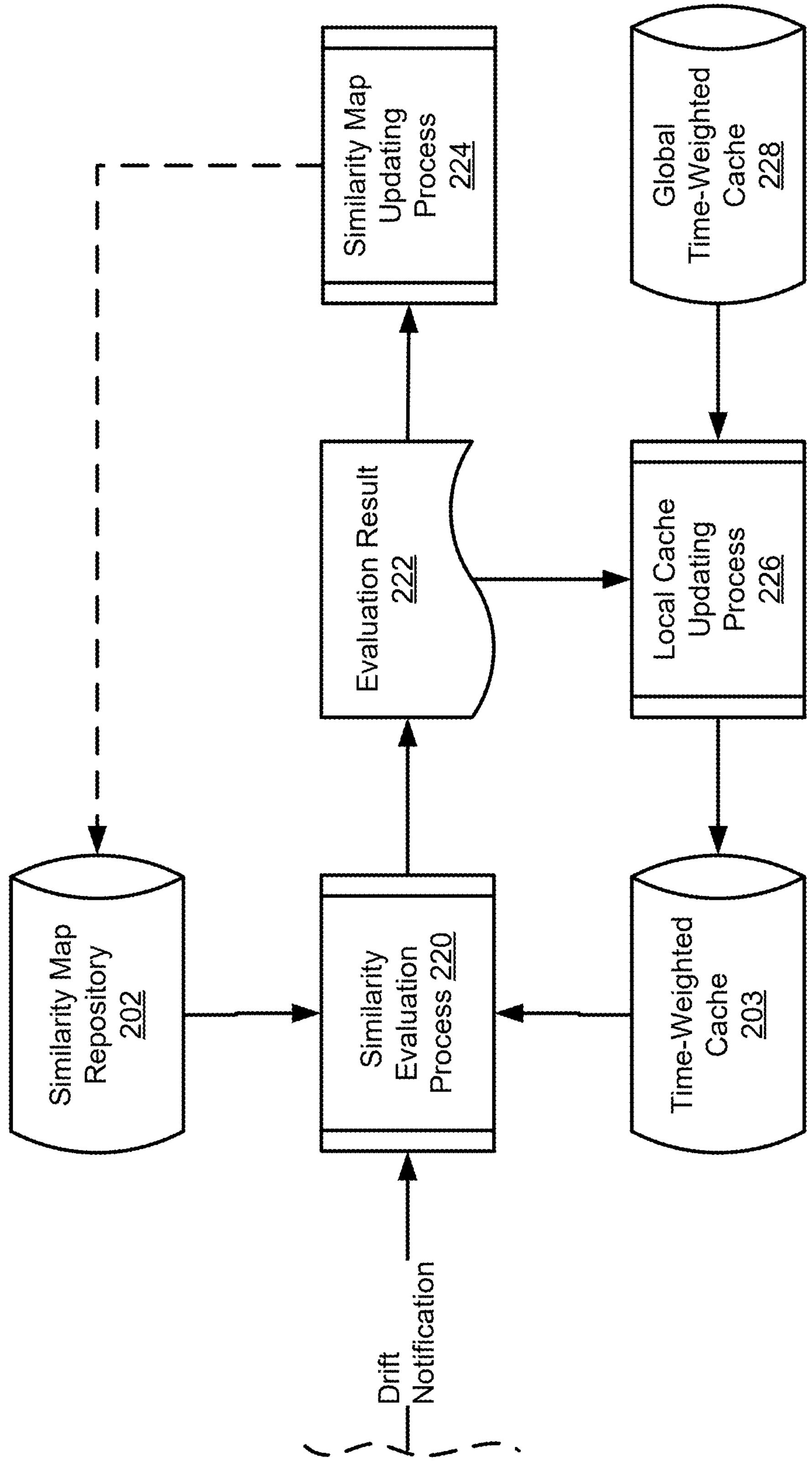
Figure 2C:
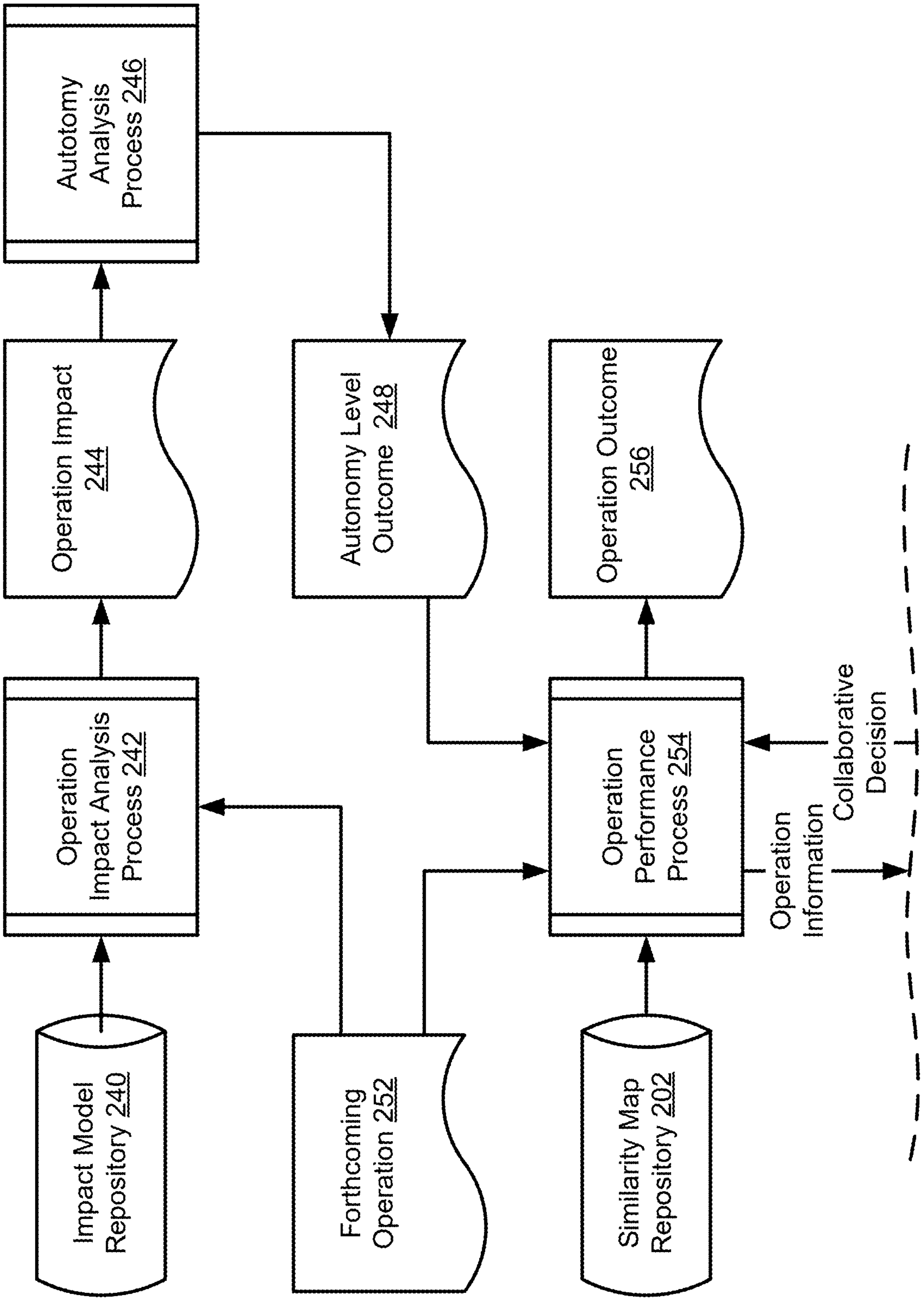
Figure 3:
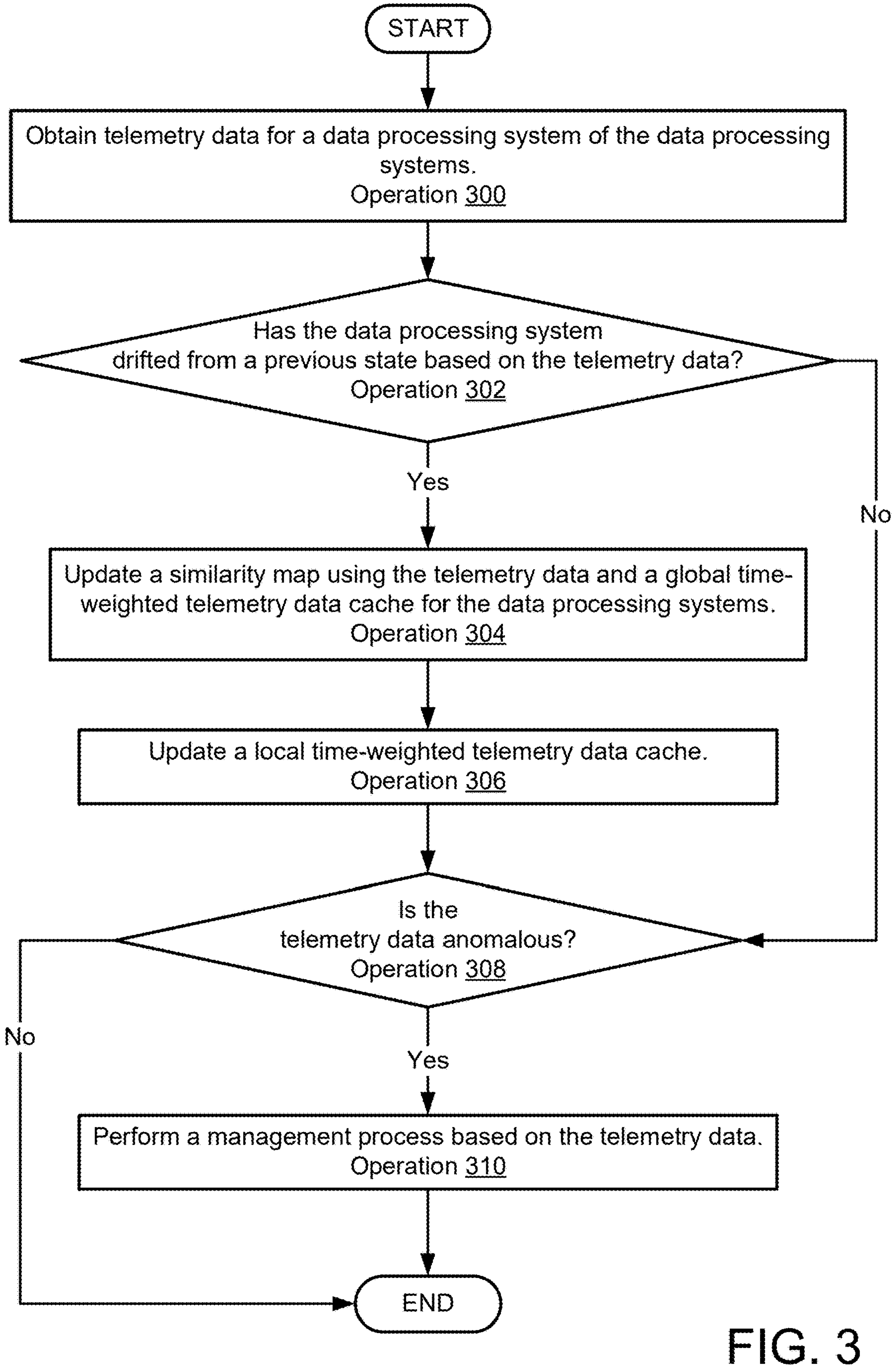
FIG. 3 shows a flow diagram illustrating a method in accordance with an embodiment.

While providing their functionality, any of data processing systems 100 and/or management system 102 may provide all or a portion of the methods shown in FIGS. 2A-3.

Communication system 104 may allow any of data processing systems 100, and management system 102 to communicate with one another (and/or with other devices not illustrated in FIG. 1). To provide its functionality, communication system 104 may be implemented with one or more wired and/or wireless networks. Any of these networks may be a private network (e.g., the "Network" shown in FIG. 4), a public network, and/or may include the Internet. For example, data processing systems 100 may be operably connected to management system 102 via the Internet. Data processing systems 100, management system 102, and/or communication system 104 may be adapted to perform one or more protocols for communicating via communication system 104.

Any of (and/or components thereof) data processing systems 100, and management system 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Thus, as shown in FIG. 1, a system in accordance with an embodiment may manage operation of a distributed system comprising data processing systems. By updating a similarity map using time-weighted telemetry data, a data processing system may be more likely to accurately detect anomalies in operation.

While illustrated in FIG. 1 with a limited number of specific components, a system may include additional, fewer, and/or different components without departing from embodiments disclosed herein.

To further clarify embodiments disclosed herein, data flow diagrams in accordance with an embodiment are shown in FIGS. 2A-2C. In these diagrams, flows of data and processing of data are illustrated using different sets of shapes. A first set of shapes (e.g., 210, 244, etc.) is used to represent data structures, a second set of shapes (e.g., 200, 206, etc.) is used to represent processes performed using and/or that generate data, and a third set of shapes (e.g., 201, 202, etc.) is used to represent large scale data structures such as databases.

Turning to FIG. 2A, a first data flow diagram in accordance with an embodiment is shown. The first data flow diagram may illustrate data used in and data processing performed in managing operation of a data processing system based on identification of an event.

To manage operation of a data processing system (e.g., 100A), event detection process 200 may be performed. During event detection process 200, an identification may be made that telemetry data for data processing system 100A indicates that operation of data processing system is anomalous. For example, the identification may be made by: (i) monitoring operation of data processing system 100A (e.g., using a software agent tasked with obtaining telemetry data (e.g., 203) generated by data processing system 100A), (ii) obtaining an anomaly threshold (e.g., detection criteria 201), (iii) obtaining second telemetry data from similar data processing systems stored in time-weighted cache 205, (iv) prompting large language model 204 based on the telemetry data from data processing system 100A and the second telemetry data from time-weighted cache 205 to identify deviations (e.g., from baseline operation of data processing system in a similarity group), (v) comparing the deviation to detection criteria 201, and/or performing any other actions to make an initial conclusion that operation of data processing system 100A may be anomalous and/or have drifted from a previous state. As a result of event detection process 200, an event result may be generated by data processing system 100A. If determined that data processing system 100A has drifted from a previous state, a similarity map maintained by data processing system 100A may be updated. Refer to FIG. 2B for additional information regarding updating the similarity map when data processing system 100A has drifted.

Detection criteria 201 may include any number and/or type of information regarding criteria usable to identify changes in operation of data processing system 100A. Detection criteria 201 may include an anomaly threshold usable to identify short-term deviations (e.g., spikes in telemetry data that may be due to undesired operation, malicious attacks, etc.) from baseline operation of data processing system 100A (e.g., based on historic telemetry data for data processing system 100A, time-weighted cache 205, etc.). Detection criteria 201 may also include a predefined drift threshold usable to identify long-term drifts in normal behavior due to changes in conditions of data processing system 100A.

Time-weighted cache 205 may store any number and/or type of information regarding telemetry data for a portion of data processing systems (e.g., 100B, 100C, etc.) deemed to be similar to data processing system 100A. For example, time-weighted cache 205 may include a local time-weighted telemetry data cache that may be updated based on a global time-weighted telemetry data cache. By maintaining an updated local time-weighted telemetry data cache, a data processing system may consider more relevant and/or recent telemetry data when detecting events (e.g., anomalies) when monitoring operation of the data processing system.

Large language model 204 may include any number and/or type of information regarding a machine learning model adapted to provide an inference based on information provided by telemetry data, similarity map, etc. For example, large language model 204 may include a machine learning architecture (e.g., a neural network framework, an artificial intelligence model, etc.), a set of parameters (e.g., weights, layers, nodes, etc.) to implement a trained large language model, and/or any other information. Large language model 204 may be prompted to identify and/or generate information relevant to identifying whether operation of data processing system is anomalous, classifying a data processing system with respect to similarity groups, and/or any other applications. When using time-weighted cache 205 (e.g., an updated local time-weighted telemetry data cache), large language model 204 may provide results (e.g., inferences) without retraining the model, for example, when a data processing system has drifted from a previous state.

Event result 206 may indicate whether telemetry data 203 is anomalous. For example, event result may be a result of comparing an anomaly score calculated based on deviation of telemetry data 203 from a baseline and detection criteria 201. In an instance where event result 206 indicates that telemetry data 203 is anomalous, event management process 210 may be performed. Additionally, event result 206 may indicate that detection criteria 201 is to be updated in criteria updating process 208 (e.g., data flow shown in long-dashed lines). For example, to adjust for drift (e.g., reduce false positives caused by drift) in operation of data processing system 100A over time, detection criteria 201 may be updated to calibrate a sensitivity of data processing system 100A with respect to detecting anomalies.

To calibrate the sensitivity with respect to detecting anomalies, criteria updating process 208 may be performed. During criteria updating process 208, a sensitivity calibration function may be used to update detection criteria. For example, detection criteria 201 may be re-calculated to obtain an updated threshold by applying a sensitivity weight to a level of drift (e.g., based on a cumulative change in telemetry data of data processing system 100A over a time window). To mitigate a risk of overcorrection, the updated threshold may be subject to bounds (e.g., a percentage of change).

In the instance where event result 206 indicates that telemetry data 203 is anomalous, event management process 210 may be performed to update operation of data processing system 100A. During event management process 214, an operation may be performed to update operation of data processing system 100A. For example, to perform the operation, (i) data processing system 100A may be repositioned with respect to similarity groups, (ii) a level of autonomy for the operation may be identified, (iii) at least one other data processing system may be identified based on the similarity map, (iv) a process may be collaboratively, between data processing system 100A and the at least one other data processing system, identified, and/or any other actions may be performed. Refer to FIG. 2C for additional details regarding performing the process to update operation of the data processing system.

Thus, using the data flow shown in FIG. 2A, operation of a data processing system may be updated when an anomaly is detected based on telemetry data for the data processing system. By doing so, the anomaly that may negatively affect the data processing system may be effectively managed while operating in the updated state.

Turning to FIG. 2B, a second data flow diagram in accordance with an embodiment is shown. The second data flow diagram may illustrate data used in and data processing performed in updating a similarity map when a data processing system is identified to have drifted from a previous state.

To obtain an evaluation result relevant to reclassification of data processing system 100 with respect to similarity groups, similarity evaluation process 220 may be performed. During similarity evaluation process 220, data processing system 100A may analyze telemetry data, and update the similarity map based on the analysis of the telemetry data. For example, to analyze the telemetry data, data processing system 100A may: (i) obtain a portion of telemetry data from time-weighted cache 205 (e.g., a local time-weighted telemetry data cache), (ii) apply a weighting algorithm to the portion of telemetry data to weight more recent telemetry data more highly when identifying levels of similarity, (iii) prioritize telemetry data from other data processing systems that may be more recent, (iv) apply a similarity function to identify levels of similarity between data processing system 100A and each of a portion of data processing systems 100, and/or perform any other actions.

Based on the analysis of the telemetry data, data processing system 100A may update the similarity map (e.g., a copy of a similarity map maintained by data processing system 100A). To do so, data processing system 100A may: (i) identify a portion of data processing systems 100 using a similarity map obtained from similarity map repository 202, (ii) communicate information (e.g., event logs, performance metrics, etc.) to the identified portion of data processing systems, (iii) evaluate membership with respect to similarity groups, (iv) add and/or remove a second portion of data processing systems 100 based on relevance of telemetry data obtained for the second portion of data processing systems, and/or perform any other actions. As a result of similarity evaluation process, an evaluation result (e.g., 222) may be obtained.

Evaluation result 222 may indicate a portion of data processing systems (e.g., 100B, 100C, etc.) that may be deemed similar to data processing system 100A based on a level of similarity that may consider more recent telemetry data to be more relevant. The local time-weighted cache may subsequently be updated to include telemetry data for the portion of similar data processing systems.

To update a local time-weighted telemetry data cache to include telemetry data of the portion (e.g., the new portion) of similar data processing systems, local cache updating process 226 may be performed. During local cache updating process 226, telemetry data stored in time-weighted cache 205 (e.g., a local time-weighted telemetry data cache) may be updated. For example, time-weighted cache 205 may be updated by (i) removing telemetry data for data processing systems that may no longer be deemed to be similar to data processing system 100, (ii) querying global time-weighted cache 228 (e.g., a time-weighted telemetry data cache, similar to time-weighted cache 205, maintained by management system 102 and/or at least a portion of data processing systems 100 that stores telemetry data for a second portion of data processing systems 100) to identify new telemetry data for the portion of data processing systems 100, (iii) adding the new telemetry data to time-weighted cache 205, and/or any other processes.

In an instance where evaluation result 222 indicates that data processing system 100A is to be reclassified to a different similarity group (e.g., data flow shown in long-dashed lines), similarity map updating process 224 may be performed. During similarity map updating process 224, at least one copy of a similarity map may be updated based on the reclassification of data processing system 100A. For example, to update the at least one copy of the similarity map, (i) data processing system 100A may modify the copy of the similarity map to reposition a node corresponding to data processing system 100A and/or modify edges connected to the node, (ii) store the modified copy of the similarity map in similarity map repository 202, (iii) exchange copies of similarity maps with other data processing systems to obtain copies of the similarity maps corresponding to different local views of the distributed system, and/or any other processes. By doing so, similarity map repository 202 may be updated following reclassification of a data processing system.

Thus, using the data flow shown in FIG. 2B, a similarity map and/or a time-weighted telemetry data cache may be updated for a data processing system when the data processing system is identified to have drifted from a previous state. By doing so, the updated similarity map and/or updated time-weighted telemetry data may be used to more accurately detect anomalous behavior of the data processing system by adjusting for the drift.

Turning to FIG. 2C, a third data flow diagram in accordance with an embodiment is shown. The third data flow diagram may illustrate data used in and data processing performed in performing, in a collaboration by at least two data processing systems, an operation.

To perform the operation, operation impact analysis process 242 may be performed. During operation impact analysis process 242, a forthcoming operation (e.g., 252) may be considered for performance by a data processing system (e.g., 100A). The forthcoming operation (e.g., 252) may include (i) migrating data from a local database to a cloud database, (ii) developing a new machine learning model for at least one predictive analysis, (iii) utilizing a new data backup and recovery strategy, etc.

Depending on at least one detail of the forthcoming operation (e.g., 252), an impact model may be obtained from an impact model repository (e.g., 240). The impact model may, for example, (i) evaluate an impact of the forthcoming operation on, for example, speed and/or capacity of a data processing system that performs the forthcoming operation, (ii) evaluate the impact of adding more data processing systems to perform with an increased workload by the forthcoming operation, (iii) evaluate an impact on security of at least one data processing system that performs the forthcoming operation, etc.

During operation impact analysis process 242, after at least one impact model has been obtained from the impact model repository (e.g., 240) and/or the forthcoming operation (e.g., 252) has been selected by an administrator, data processing system 100A, a user, etc., an impact analysis may be performed. To perform the impact analysis, at least one simulation may be conducted by data processing system 100A with the impact model. The simulation may ingest the forthcoming operation (e.g., 252), as well as historical data and/or current data that can be used in the forthcoming operation (e.g., 252). Further, at least one parameter (throughput, latency, response time, at least one resource, etc.) may be adjusted to vary an operation impact (e.g., 244)

The operation impact (e.g., 244) may be generated by the impact model. The outcome impact (e.g., 244) may include at least one measurable effect of performing the forthcoming operation (e.g., 252) by data processing system 100A. Specific examples of the at least one measure effect may include (i) a measure of greenhouse gas emission, energy consumption, waste generation, etc. in a manufacturing operation, (ii) revenue change, cost savings, profit margin, etc. in a financial operation, (iii) system uptime, error frequency, new product development rates, etc. of a new technology, etc.

The operation impact (e.g., 244) may include short-term effects and/or long-term effects that occur during the forthcoming operation (e.g., 252). The short-term effects may appear at any time during the forthcoming operation (e.g., 252) and/or disappear within a short period of time. The long-term effects may appear at any time during the forthcoming operation (e.g., 252) and/or persist for a long period of the time. The short-term effects and/or the long-term effects may contribute to any variation in the operation impact (e.g., 244).

Based on the at least one measurable effect and/or the short-term effects and/or long-term effects of the operation impact (e.g., 244) autonomy analysis process 246 may be performed. During autonomy analysis process 246, an autonomy model may ingest the operation impact (e.g., 244) to determine an autonomy level outcome (e.g., 248). The autonomy level outcome (e.g., 248) may include a level of the autonomy that can be identified by granting, by an autonomy model, a measure of discretion to data processing system 100A in a performance of the forthcoming operation. The measure of discretion may include a less autonomous (e.g., command-driven), a partially autonomous (e.g., consensus-based), a more autonomous (e.g., self-directed), etc. performance of the forthcoming operation (e.g., 252) by data processing system 100A. With the measure of the discretion, the autonomy model may direct how data processing system 100A may collaborate with at least one other data processing system (e.g., 100B, etc.) of the deployment.

During autonomy analysis process 246, the autonomy model may determine the autonomy level outcome (e.g., 248) by assessing a magnitude (e.g., high, low, moderate, etc.) of the operation impact (e.g., 244). Based on the magnitude, the autonomy model may, using the autonomy level outcome (e.g., 248), direct how data processing system 100A may collaborate with at least one other data processing system during operation performance process 254.

The autonomy model may direct how data processing system 100A may collaborate by guiding data processing system 100A in a selection of, using a similarity map a similarity map repository (e.g., 202), the at least one other data processing system (e.g., 100B, etc.) based on a measure of similarity between data processing system 100A and the at least one other data processing system (e.g., 100B). If the forthcoming operation (e.g., 252) has a low impact level (i.e., from the operation impact (e.g., 244)), the autonomy model may enable data processing system 100A to select the at least one other data processing system (e.g., 100B, etc.) that is mostly similar to data processing system 100A. However, if the forthcoming operation has a high impact level (i.e., from the operation impact (e.g., 244)), the autonomy model may enable data processing system 100A to select the at least one other data processing system (e.g., 100B, etc.) that is similar and/or dissimilar to data processing system 100A.

Selecting, by data processing system 100A, the at least one other data processing system (e.g., 100B, etc.) that is similar and/or dissimilar may enable data processing system 100A to, for example, (i) learn a diverse approach to performing the forthcoming operation, (ii) utilize different resources to perform the forthcoming operation, etc. Data processing system 100A may, for example, (i) learn the diverse approach, (ii) utilize the different resources, etc. by (i) passing operation information to the at least one other data processing system (e.g., 100B, etc.) and/or (ii) reaching at least one collaborative decision with the at least one other data processing system (e.g., 100B, etc.).

In a collaboration with the at least one other data processing system (e.g., 100B, etc.) for performance of the forthcoming operation (e.g., 252), operation outcome (e.g., 256) may be generated. The operation outcome (e.g., 256) may include the at least one measurable effect (which may be included in the operation impact (e.g., 244)) and/or at least one result of performing the forthcoming operation (e.g., 252) by data processing system 100A and/or the at least one other data processing system (e.g., 100B, etc.). However, by performing the forthcoming operation (e.g., 252) in the collaboration, the at least one measurable effect (from the operation impact (e.g., 244)), at least one short-term effect and/or at least one long-term effect of the forthcoming operation (e.g., 252) may not be observed.

The at least one measurable effect (from the operation impact (e.g., 244)), the at least one short-term effect and/or the at least one long-term effect may not be observed because the collaboration may have resulted in a new approach to performing the forthcoming operation (e.g., 252).

For example, a first data processing system (e.g., 100A) may perform spam detection of incoming e-mails for a business using certain keywords. However, an approach using basic keyword detection to filter e-mails may incorrectly flag and/or trash legitimate e-mails, which can have a measurable impact on commerce in a business that uses the first data processing system (e.g., 100A).

To enable for more accurate spam detection of the e-mails, a second data processing system (e.g., 100B) may be used. The second data processing system (e.g., 100B), selected from the similarity map, may be used by (i) receiving a flagged e-mail from the first data processing system (e.g., 100) and (ii) sending the flagged e-mail to a trained inference model to generate an output. The output may include a determination of whether the flagged e-mail is spam. Further, the second data processing system (e.g., 100B) may use historical e-mails, already determined to be spam, to train and/or update the inference model.

Thus, via the third data flow illustrated in FIG. 2C, a system in accordance with an embodiment may perform, in the collaboration by the at least two data processing systems, the operation. Consequently, a data processing system may be more likely to be able to provide desired computer-implemented services by leveraging combined computational resources of data processing systems.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1 may perform various methods to manage data processing systems. FIG. 3 illustrates a method that may be performed by the components of the system of FIG. 1. In the diagrams discussed below and shown in FIG. 3, any of the operations may be repeated, performed in different orders, and/or performed in parallel with or in a partially overlapping in time manner with other operations.

Turning to FIG. 3, a flow diagram illustrating a method of managing operation of a distributed system comprising data processing systems in accordance with an embodiment is shown. The method may be performed, for example, by any of the components of the system of FIG. 1, and/or other components not shown therein.

At operation 300, telemetry data may be obtained for a data processing system of the data processing systems. The telemetry data may be obtained by: (i) running software agents (e.g., DataDog, Dynatrace, etc.) on the data processing system to collect the telemetry data (e.g., uptime, memory consumption, etc.), (ii) attaching a sensor to the data processing system to capture diagnostic data, (iii) receiving the telemetry data via real-time streaming, (iv) retrieving the telemetry data from a database hosted by the data processing system, and/or via any other processes.

At operation 302, a determination may be made regarding whether the data processing system has drifted from a previous state. The determination may be made by: (i) obtaining historic telemetry data for the data processing system from a database, (ii) obtaining a predefined drift threshold for identifying that the data processing system has drifted, (iii) calculating a drift score based on a cumulative change in telemetry data over time, (iv) comparing the drift score to the predefined drift threshold, and/or via any other processes. If the data processing system is determined to have drifted (e.g., the determination is "Yes" at operation 302), the method may proceed to operation 304. If the data processing system is determined to not have drifted (e.g., the determination is "No" at operation 302), the method may proceed to operation 308.

At operation 304, a similarity map may be update using the telemetry data and a global time-weighted telemetry data cache for the data processing systems. The similarity map may be updated by: (i) applying a weighting algorithm to telemetry data of the global time-weighted telemetry data cache to weight more recent telemetry data over time more highly, (ii) computing a level of similarity (e.g., cosine similarity) for each data processing system of the data processing system between the each data processing system and the first data processing system, (iii) reclassifying the data processing system with respect to a plurality of similarity groups indicated by the similarity map, and/or via any other processes.

At operation 306, a local time-weighted telemetry cache may be updated for the portion of the data processing systems to obtain an updated local time-weighted telemetry data cache. The local time-weighted telemetry cache may be updated by: (i) removing telemetry data for the portion of data processing systems that may no longer be deemed to be similar to the data processing system, (ii) filtering the global time-weighted telemetry data cache to identify new telemetry data for the portion of data processing systems, (iii) adding the new telemetry data to the local time-weighted telemetry data cache, (iv) calibrating an anomaly detection threshold based on the updated local time-weighted telemetry data cache, and/or any other processes.

At operation 308, a determination may be made regarding whether the telemetry data is anomalous. The determination may be made by: (i) computing a baseline for normal operation of the data processing system based on historic telemetry data and/or the local time-weighted telemetry data cache, (ii) computing an anomaly score based on deviation of the telemetry data from the baseline, (iii) comparing the anomaly score to an anomaly threshold to identify whether the telemetry data meets criteria to be considered an anomaly, and/or via any other processes. If the telemetry data is determined to be anomalous (e.g., the determination is "Yes" at operation 308), the method may proceed to operation 310. If the telemetry data is determined to not be anomalous (e.g., the determination is "No" at operation 308), the method may end following operation 308.

At operation 310, a management process may be performed based on the telemetry data to facilitate continued provisioning of computer-implemented services. The management process may be performed by: (i) identifying a level of autonomy of an operation to be performed by the data processing system, (ii) identifying at least one other data processing system based on the different similarity group, (iii) collaboratively identifying and/or performing a process to update operation of the data processing system, (iv) updating a configuration for operation of the data processing system, and/or performing any other actions.

The method may end following operation 310.

Using the method shown in FIG. 3, operation of data processing systems in a distributed system may be managed by updating a similarity map and/or a local time-weighted telemetry data cache when telemetry data for the data processing system is determined to have drifted from a previous state. By doing so, the data processing system may be more likely to be updated for providing desired computer-implemented services when anomalous behavior is identified.

Figure 4:
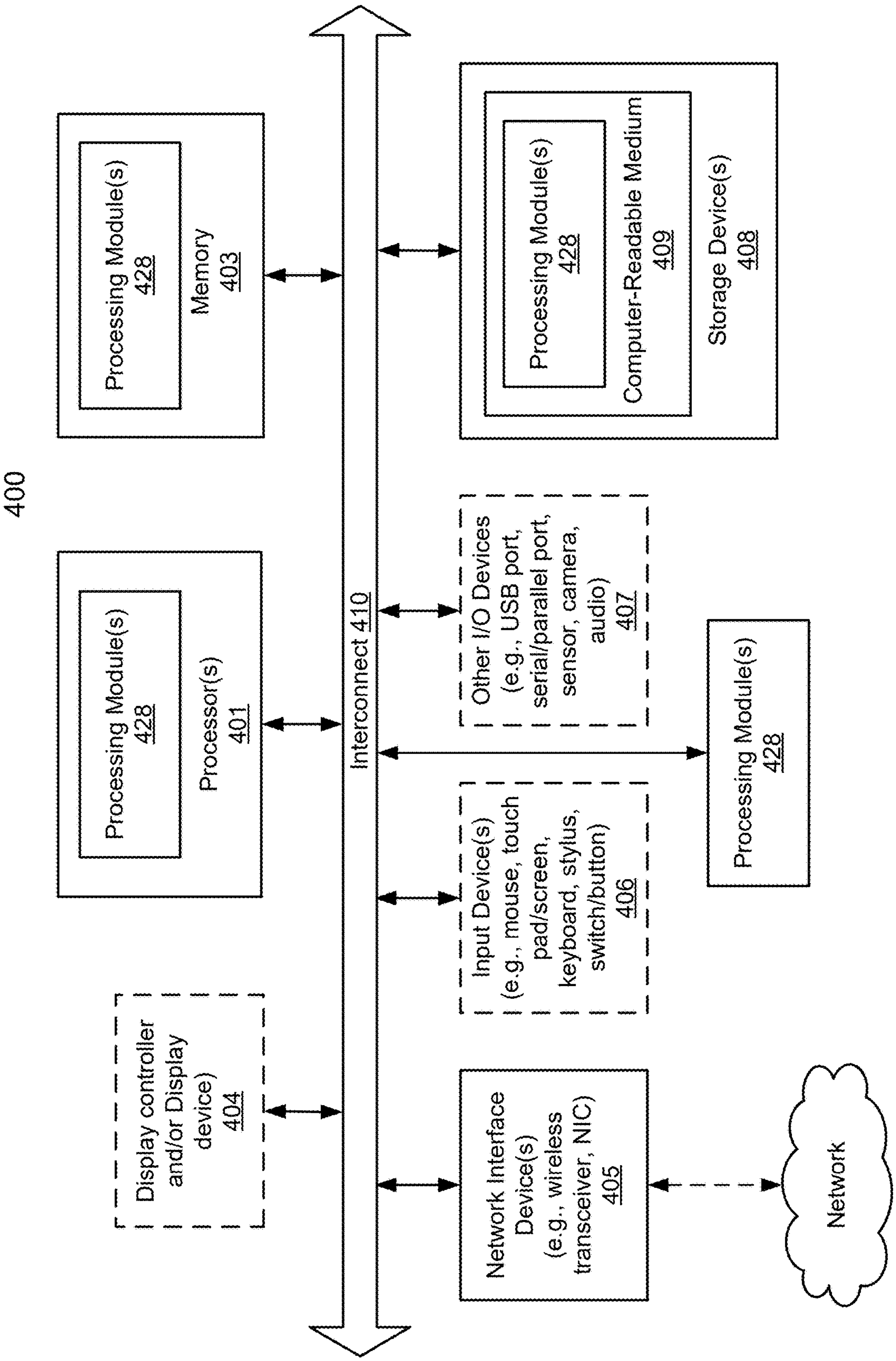
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term “computer-readable storage medium” should be taken to include a single medium or multiple media (e.g., a centralized or distributed database, and/or associated caches and servers) that store the one or more sets of instructions. The terms “computer-readable storage medium” shall also be taken to include any medium that is capable of storing or encoding a set of instructions for execution by the machine and that cause the machine to perform any one or more of the methodologies of embodiments disclosed herein. The term “computer-readable storage medium” shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a distributed system comprising data processing systems, the method comprising:

obtaining telemetry data for a data processing system of the data processing systems;

making a first determination regarding whether the data processing system drifted from a previous state using the telemetry data and historic telemetry data for the data processing system;

in a first instance of the first determination where the data processing system has drifted:

updating a similarity map using the telemetry data and a global time-weighted telemetry data cache for the data processing systems, the updated similarity map indicating a portion of the data processing systems as being similar to the data processing system;

updating a local time-weighted telemetry data cache for the portion of the data processing systems to obtain an updated local time-weighted telemetry data cache;

making a second determination regarding whether the telemetry data is anomalous using the updated local time-weighted telemetry data cache; and in a first instance of the second determination where the telemetry data is anomalous:

performing a management process for the data processing system based on the telemetry data to facilitate continued provisioning of computer implemented services.

2. The method of claim 1, further comprising:

in a second instance of the first determination where the data processing system has not drifted:

making a third determination regarding whether the telemetry data is anomalous using the local time-weighted telemetry data cache; and in a first instance of the third determination where the telemetry data is anomalous:

performing a second management process for the data processing system based on the telemetry data to facilitate continued provisioning of the computer implemented services.

3. The method of claim 2, wherein the local time-weighted telemetry data cache comprises telemetry data over time from at least one of the data processing systems deemed to be similar to the data processing system by the similarity map.

4. The method of claim 3, wherein updating the similarity map comprises:

applying a weighting algorithm to the telemetry data to weight more recent telemetry data of the telemetry data over time more highly in identifying levels of similarity between the data processing system and other data processing systems of the data processing systems.

5. The method of claim 4, wherein the weighting algorithm applies exponentially decaying weights to the telemetry data over time.

6. The method of claim 1, wherein the similarity map quantifies levels of similarity between the data processing systems, and the portion of the data processing systems is discriminated from the data processing systems based on the levels of similarity.

7. The method of claim 6, wherein the levels of similarity are based on, for the data processing system:

device information;

network information;

configuration information; and workload information.

8. The method of claim 1, wherein performing the management process comprises:

identifying a level of autonomy for selection of a manner in which to perform the management process based on an estimated impact level of a forthcoming operation of the management process.

9. The method of claim 8, wherein the level of autonomy is identified using an autonomy model that vests more decision power in the data processing system as the estimated impact level is reduced and vests less decision power in the data processing system as the estimated impact level is increased.

10. The method of claim 8, wherein the performing the management process further comprises:

identifying a second portion of the data processing systems using the similarity map; and collaboratively performing, by the data processing system and the second portion of the data processing systems, the forthcoming operation in accordance with the selected manner of the management process.

11. A non-transitory machine-readable medium having instructions stored therein, which when executed by a processor, cause the processor to perform operations for managing operation of a distributed system comprising data processing systems, the operations comprising:

obtaining telemetry data for a data processing system of the data processing systems;

making a first determination regarding whether the data processing system drifted from a previous state using the telemetry data and historic telemetry data for the data processing system;

in a first instance of the first determination where the data processing system has drifted:

updating a similarity map using the telemetry data and a global time-weighted telemetry data cache for the data processing systems, the updated similarity map indicating a portion of the data processing systems as being similar to the data processing system;

updating a local time-weighted telemetry data cache for the portion of the data processing systems to obtain an updated local time-weighted telemetry data cache;

making a second determination regarding whether the telemetry data is anomalous using the updated local time-weighted telemetry data cache; and in a first instance of the second determination where the telemetry data is anomalous:

performing a management process for the data processing system based on the telemetry data to facilitate continued provisioning of computer implemented services.

12. The non-transitory machine-readable medium of claim 11, the operations further comprise:

in a second instance of the first determination where the data processing system has not drifted:

making a third determination regarding whether the telemetry data is anomalous using the local time-weighted telemetry data cache; and in a first instance of the third determination where the telemetry data is anomalous:

performing a second management process for the data processing system based on the telemetry data to facilitate continued provisioning of the computer implemented services.

13. The non-transitory machine-readable medium of claim 12, wherein the local time-weighted telemetry data cache comprises telemetry data over time from at least one of the data processing systems deemed to be similar to the data processing system by the similarity map.

14. The non-transitory machine-readable medium of claim 13, wherein updating the similarity map comprises:

applying a weighting algorithm to the telemetry data to weight more recent telemetry data of the telemetry data over time more highly in identifying levels of similarity between the data processing system and other data processing systems of the data processing systems.

15. The non-transitory machine-readable medium of claim 14, wherein the weighting algorithm applies exponentially decaying weights to the telemetry data over time.

16. A system, comprising:

a processor; and a memory coupled to the processor to store instructions, which when executed by the processor, cause the processor to perform operations for managing operation of a distributed system comprising data processing systems, the operations comprising:

obtaining telemetry data for a data processing system of the data processing systems;

making a first determination regarding whether the data processing system drifted from a previous state using the telemetry data and historic telemetry data for the data processing system;

in a first instance of the first determination where the data processing system has drifted:

updating a similarity map using the telemetry data and a global time-weighted telemetry data cache for the data processing systems, the updated similarity map indicating a portion of the data processing systems as being similar to the data processing system updating a local time-weighted telemetry data cache for the portion of the data processing systems to obtain an updated local time-weighted telemetry data cache;

making a second determination regarding whether the telemetry data is anomalous using the updated local time-weighted telemetry data cache; and in a first instance of the second determination where the telemetry data is anomalous:

performing a management process for the data processing system based on the telemetry data to facilitate continued provisioning of computer implemented services.

17. The system of claim 16, the operations further comprise:

in a second instance of the first determination where the data processing system has not drifted:

making a third determination regarding whether the telemetry data is anomalous using the local time-weighted telemetry data cache; and in a first instance of the third determination where the telemetry data is anomalous:

performing a second management process for the data processing system based on the telemetry data to facilitate continued provisioning of the computer implemented services.

18. The system of claim 17, wherein the local time-weighted telemetry data cache comprises telemetry data over time from at least one of the data processing systems deemed to be similar to the data processing system by the similarity map.

19. The system of claim 18, wherein updating the similarity map comprises:

applying a weighting algorithm to the telemetry data to weight more recent telemetry data of the telemetry data over time more highly in identifying levels of similarity between the data processing system and other data processing systems of the data processing systems.

20. The system of claim 19, wherein the weighting algorithm applies exponentially decaying weights to the telemetry data over time.

* * * * *